United States Patent [19]
Duret

[11] 3,854,760

[45] Dec. 17, 1974

[54] JOINT FOR OIL WELL DRILLING PIPE

[75] Inventor: Jean Duret, Aulnoye-Aymeries, France

[73] Assignee: Societe anonyme dite: Vallourec (Usines a Tubes de Lorraine-Escaut et Vallourec Reunies), Paris, France

[22] Filed: Feb. 22, 1973

[21] Appl. No.: 334,944

[30] Foreign Application Priority Data
Feb. 25, 1972 France .............................. 72.6471

[52] U.S. Cl. ................. 285/334, 285/381, 285/417
[51] Int. Cl. ............................................. F16l 25/00
[58] Field of Search .......... 285/333, 334, 417, 390, 285/381; 403/118, 343

[56] References Cited
UNITED STATES PATENTS
2,273,017  2/1942  Boynton ......................... 285/334 X
2,574,081  11/1951  Abegg ............................ 285/417 X FOREIGN PATENTS OR APPLICATIONS
6,615,311  5/1967  Netherlands ..................... 285/334
1,224,136  3/1971  Great Britain .................... 285/334

Primary Examiner—Dave W. Arola
Attorney, Agent, or Firm—Brisebois & Kruger

[57] ABSTRACT

Joint for oil well drilling pipe comprises a sleeve screwed onto the end of a pipe section to form the internally threaded portion of the female part of the joint, while the end of the pipe section onto which the sleeve is screwed constitutes a shoulder against which the end of the other pipe section abuts.

11 Claims, 5 Drawing Figures

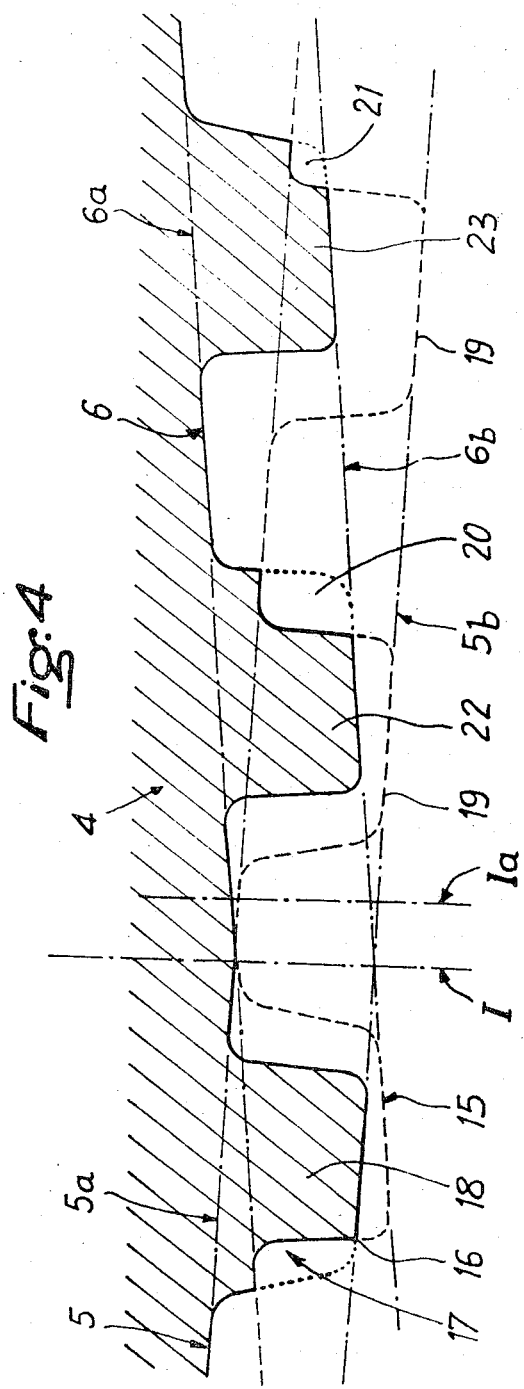
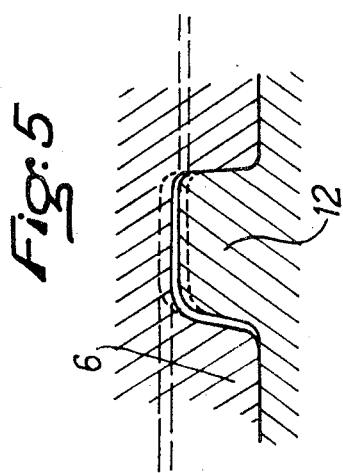

JOINT FOR OIL WELL DRILLING PIPE

SUMMARY OF THE INVENTION

This invention relates to a joint for metal pipes, especially for use in the petroleum industry. It is well known that in the oil well drilling industry it is necessary to use a large number of steel pipe sections which are connected by joints which are ordinarily screwed together. These joints must be periodically screwed together and taken apart and the tube sections are generally interchanged from one assembly to the next.

Such joints must have a mechanical strength at least equal to that of the parts of the pipes between the joints. They must also be perfectly gas and liquid tight even when subjected to high internal or external pressures.

Moreover, taking into account the difficult conditions which these pipes encounter at the drilling sites, it is necessary that they have a substantial resistance to the impacts to which the threads and the ends of the sections are subjected, especially in the case of the male ends.

The present invention relates to a type of pipe in which the male member and the female member comprise threads which mate with each other and which are located on frusto-conical surfaces having the same taper, so that when the male member is screwed into the female member the result is a progressive radial compression of the male member and radial expansion of the female member.

The invention relates especially to joints of this type in which the female member comprises a shoulder at the inner end of its thread, against which shoulder the end of the male member abuts when the joint is fully made up.

In this type of joint the shoulder has an annular central zone in the shape of a flattened convex cone (that is to say, an open cone, the top of which is at the inside of the zone), whereas the end of the male member has a front surface having a mating conicity.

This central annular zone of the shoulder is encircled by a substantially frusto-conical concave zone (that is to say one in which the conicity is such that the top of the section of the cone is at the inside of the zone).

It follows that, as the male member is screwed into the female member, the end of the male member which must abut against the central zone of the shoulder is urged radially inward by the slope of the outer cone and then outwardly once the end of the male part abuts the central part of the shoulder, since the slope of this central part is greater than the angle of friction of the end of the male member on the shoulder. The outer part of the end of the male member is thus urged with increased force against the concave peripheral zone of the shoulder so as to ensure an increasingly effective seal.

This urging of the end of the male member toward the outside is possible because of the existence of a clearance between the end of the male member and the opposed surface of the female member which lies between the inner end of the thread of the female member and the shoulder.

Joints of this type are particularly valuable. They are especially effective in insuring a perfect seal which is compatible with the interchangeability of the male members and the female members, despite the deterioration of the end of the male member which inevitably occurs during the use of oil well drilling pipes.

The present invention relates to a joint of the type generally described in which the female member, instead of being formed in the thickened end of a pipe, is produced by mounting a threaded sleeve on the end of a pipe section.

Consequently, in accordance with the invention, the female member consists of a sleeve mounted permanently on a male member which, for greater clarity, will hereinafter be referred to as the "false male member" in contradistinction to the other member which will be referred to as the "true male member."

It is the object of the present invention to provide as a new article of manufacture a joint for metallic pipes, particularly for use in the petroleum industry, of the type in which the end of the male member has a thread formed on a frusto-conical surface which screws into the mating thread on a frusto-conical surface on the end of a composite female member. A shoulder positioned at the inner end of the thread in the composite female member limits the extent to which the male member can be inserted since the end of the male member abuts against this shoulder, which has on its internal periphery a convex conical zone urging the end of the male member outwardly against a peripheral concave zone on the shoulder. A lateral clearance is provided between an unthreaded end part of the male member and the part of the female member situated there opposite. The joint is characterized by the fact that the female member is a composite member made from a sleeve provided with two female threads positioned on two frusto-conical surfaces, one of these two threads receiving the threads of the true male member whereas the other permanently receives the corresponding threads of a false male member, with the end of the false male member defining the convex conical zone and the peripheral concave zone, and a lateral clearance existing between the end of the false male member and the corresponding part of the threaded sleeve.

In a preferred embodiment of the invention the male member occupies, during assembly of the joint, a position such that the part of the thread of the true male member which is beyond the neck of the sleeve (the area connecting the two frusto-conical surfaces on which the two threads of the sleeve are cut) bears against recesses formed in the rear faces of the threads of the sleeve to which the false male elements are connected. The recesses in question may be easily formed by cutting the threads of the sleeve in a symmetrical manner with respect to the plane of the neck (the plane in which the threaded cones of the sleeve intersect), but with an axial displacement of one of the threads by a fraction of the thickness of the thread.

In accordance with the invention, the clearance between the ends of the false male member and the part of the sleeve mounted thereopposite must have a magnitude such that the end of the false male member can deform radially to compensate for the manufacturing tolerances without undergoing permanent deformation (that is to say, deformation beyond its elastic limit) to an extent sufficient to prevent interchangeability of the female members and the true male members.

The manufacturing tolerances in question correspond to the angular displacement of the two longitudinal axes of the threads of the sleeve and the lateral displacement between these two axes. In other words, these tolerances correspond to an angular non-alignment and a lateral displacement of the axes of the two threads of the sleeve.

As a consequence of the clearance in accordance with the invention the deformations which take place at the ends of the true male member and the false male member make it possible to compensate for geometrical errors due to the manufacturing tolerances, while assuring a perfectly tight seal. This clearance also makes it possible to avoid having the deformations due to wear during tightening of the joint change the shape and position of the shoulder.

The clearance between the end of the false male member and the corresponding part of the sleeve may be provided in various ways, for example by increasing the conicity of the thread of the false male member at the end thereof, or by reducing the conicity of the sleeve opposite the end of the false male member, or by providing a sleeve which has a cylindrical threaded surface in its central part.

In order to assure satisfactory assembly it is preferable, but not indispensable, to make the depth of the grooves between the threads of the female threads greater than the height of the threads of the male members. In this way, the friction produced during the mounting of a sleeve on a false male member is more regular because it results only from contact between the crests of the female threads and the groove between the male threads, and between the frontal surfaces of the two threads. The female member is formed by tightening the sleeve on the false male member with a predetermined torque.

The result, according to the invention, is a composite female member made from a tubular sleeve and a false male member which has the same characteristics of strength as a female member made by forging the end of a pipe section and conventional machining of the threads and the shoulder.

The pipe sections comprising the composite female members according to the invention may also be used with other pipe sections having conventional female members at one end and identical male members at the other so as to afford complete interchangeability between the female members heretofore known and those in accordance with the invention.

The female members according to the invention have the advantage of being more economical than female members made in one piece. They also permit repairs by rebuilding the female members at the ends of damaged pipe section, which may be done by simple machining without its being necessary to thicken the end of the pipe section.

Moreover, the invention has the advantage of preventing fluid which circulates inside the tube from coming into contact with the sleeve which, for this reason, may be made of a steel selected for its mechanical strength without consideration of the resistance of this steel to corrosion by the fluid transported inside the pipe. Similarly, the nature of the metal of the sleeve may be selected in dependence upon the corrosion to which the outer surface of the sleeve is to be subjected.

In effect, it will be noted that, in accordance with the invention, two consecutive tubular pipe sections are connected end to end (the end of the true male member abutting the end of the false male member) while they are connected and held together by the tubular sleeve. Moreover, the fact that the ends of the true and false male members are subjected to radial and axial compressions, that is to say, tridimensional compression, imparts thereto an excellent resistance to hydrogen embrittlement.

In order that the invention may be better understood, several embodiments thereof will now be described, purely by way of illustration and example, with reference to the accompanying drawings on which:

FIG. 4 is a partial sectional view showing the interpenetration of the two female threads of the sleeve; and FIG. 5 is a schematic sectional view showing the clearance between the threads of the false male member and the sleeve in one particular embodiment of the invention.

Figure 1:
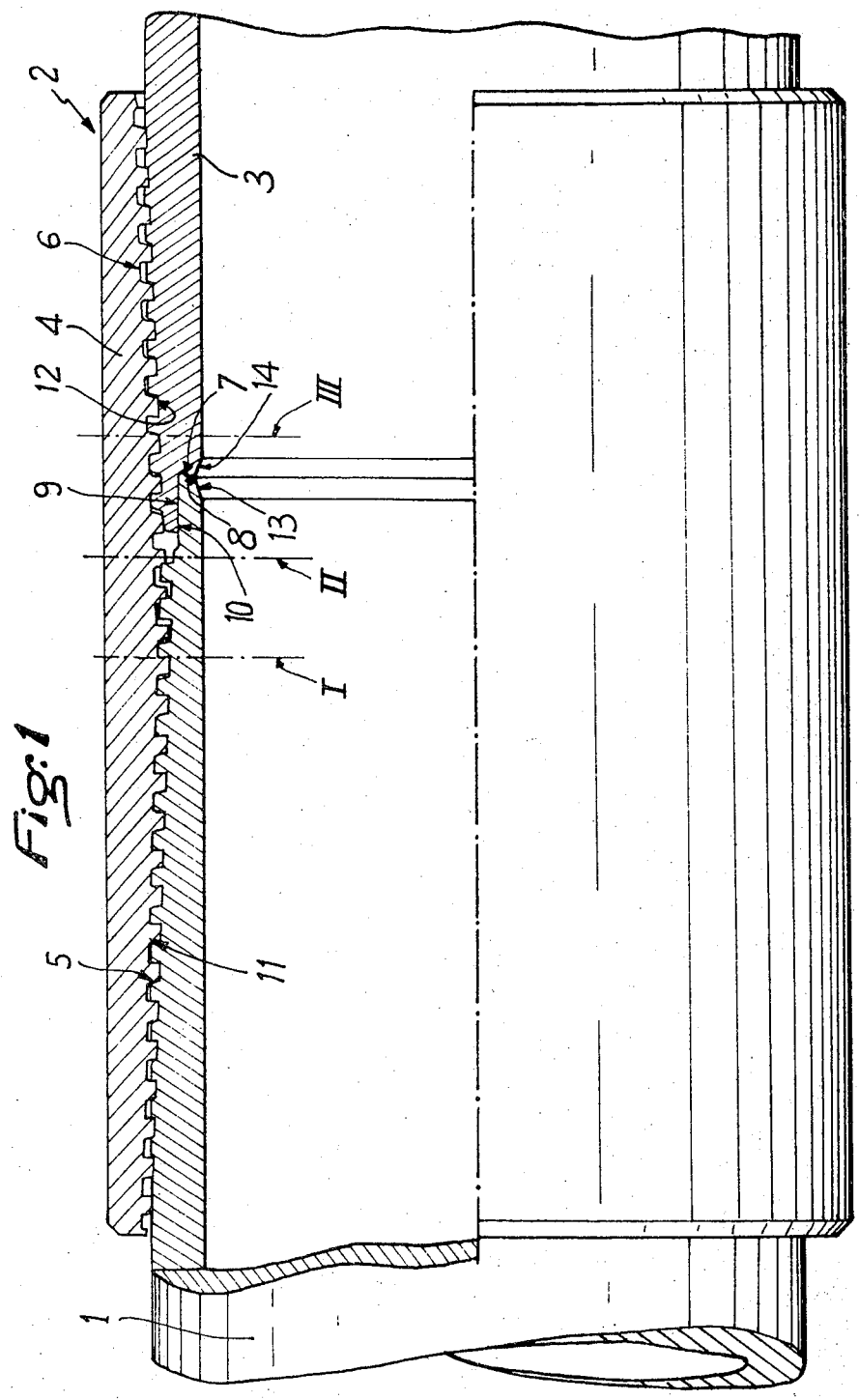
FIG. 1 is a partial sectional view taken through a joint according to the invention.

On the drawing, the male member is indicated by reference numeral 1 and the female member by reference numeral 2. In accordance with the invention the female member consists of a false male member 3 on which is permanently mounted a threaded sleeve 4. In the embodiment illustrated on the drawing, the sleeve comprises two female threads 5 and 6 on symmetrical frusto-conical surfaces with respect to the plane I at which the two threaded cones of the sleeve intersect.

The relative positions of the two threads 5 and 6 will hereinafter be described in greater detail.

The false male member 3 is provided at its end with a shoulder which limits the extent to which the male member may be screwed into the female member and insures the sealing of the joint.

This shoulder comprises a frusto-conical convex zone 7 about its inner periphery and the top of this zone is toward the inside of the female member 2. The surface of this frusto-conical zone 7 defines with a plane normal to the axis of the joint an angle at least equal to the angle of friction between said surface and the mating part 8 of the end of the male member during tightening of the joint. This angle is usually between 10° and 30° and, in particular, between 15° and 20°. The shoulder at the end of the false male member 3 also comprises a concave peripheral zone 9 which is inclined in the opposite direction with respect to the inclination of the frusto-conical zone 7. The inclination of the peripheral zone 9 may vary within broad limits in dependence on the type of joint. In accordance with one particular embodiment of the invention the inclination is about 60° with respect to a plane perpendicular to the axis of the joint. In another embodiment the inclination of the frusto-conical zone 9 may be from 8° to 15° expressed as a variation of the diameter of the cone with respect to the axial displacement.

While the zone 7 may be, in accordance with the invention, a geometrically frusto-conical surface which permits sliding on the corresponding frusto-conical surface 8 of the end of the male member 1, the peripheral zone 9 is not necessarily a frusto-conical surface in the geometric sense of the term since its only function is to serve as a stop and seal at the outer end of the male member when the latter is forced outwardly by the frusto-conical zone 7.

The projection of the frusto-conical zone 7 on a plane perpendicular to the axis of the joint defines a surface which is substantially greater than that of the projection of the peripheral zone 9 on the same plane. In effect, the surface of the frusto-conical zone 7 must be large enough to limit the screwing of the male member into the female member without producing permanent deformation at the level of the surfaces 7 and 8 of the male and female members. On the contrary, the peripheral surface 9 is merely intended to constitute an abutment for laterally receiving the corresponding surface 10 of the male member 1 when the end of the latter is urged outwardly as the surface 8 slides radially on the surface 7. In this manner, during assembly, the surface 9 is subjected principally to radial forces, whereas the surface 7 is subjected principally to axial forces.

During the assembly of the joint deformations are thus produced in and near the surface 10 in the male member 1 which, in certain cases, may be permanent. This insures the automatic repair of any damage which may have been caused to this particularly sensitive zone on the end of the male member, for example by impacts during introduction of the male member into the female member.

The male member is provided with frusto-conical threads 11 which mate with the threads 5 on the sleeve, while the false male member 3 is provided with frusto-conical threads 12 which mate with the threads 6.

Figure 2:
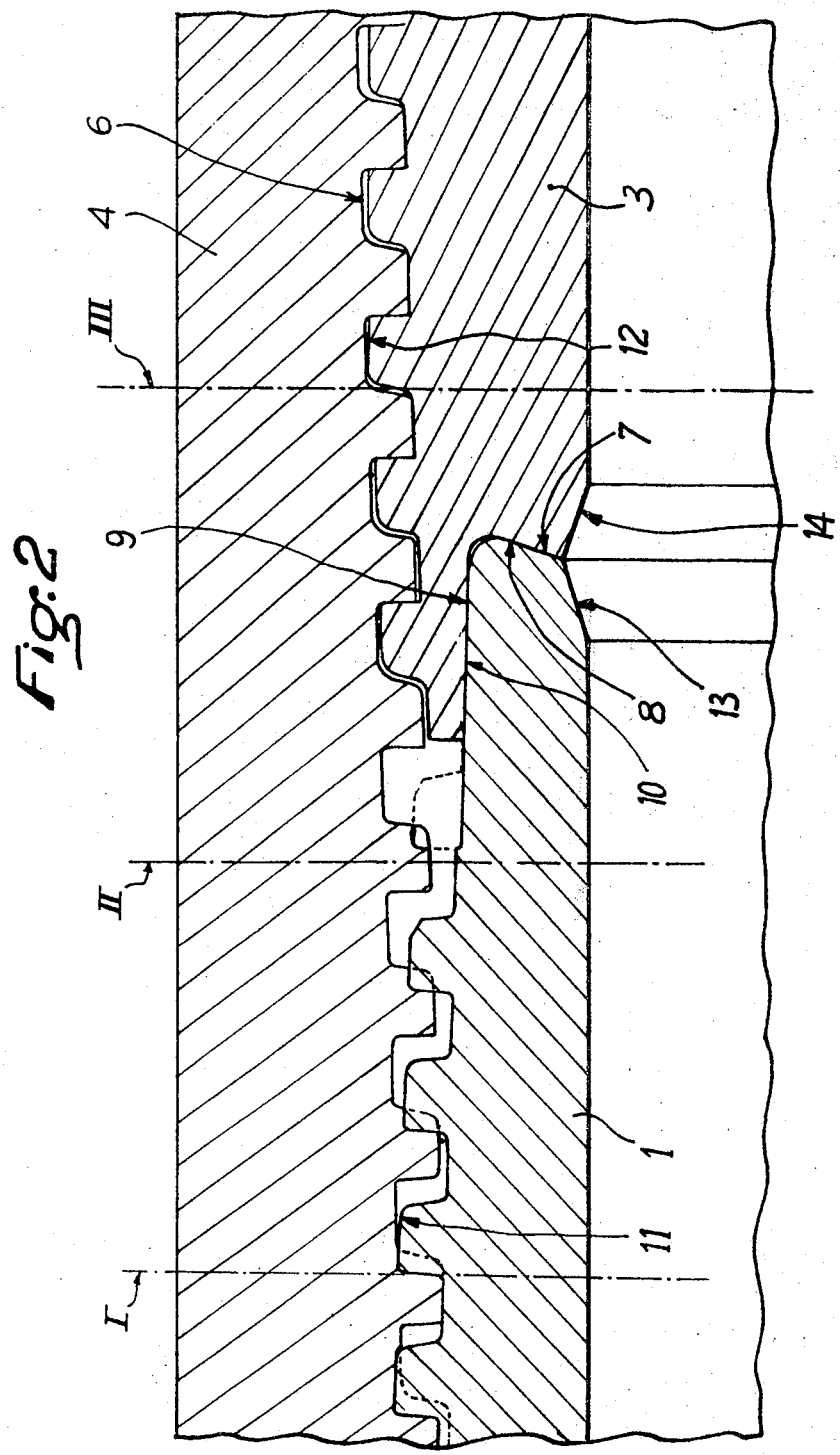
FIG. 2 is a sectional view on a larger scale of the zone in which the true male member and the false male member are connected.

FIG. 2 shows three planes I, II, III perpendicular to the axis of the joint. Plane I corresponds to the plane in which the two frusto-conical surfaces of the sleeve 4 provided with the threads 5 and 6 are connected. In the embodiment described the plane I is at an equal distance from the two ends of the sleeve.

Plane II corresponds to the end of the zone in which the threads 11 of the male member 1 engage the threads 5 of the sleeve 4 during assembly. The threads 5 of the sleeve 4 extend beyond plane I but occupy only part of the zone between planes II and III since this zone is also partially occupied by the threads 6 of the sleeve 4. At plane III a lateral clearance begins to exist between the end of the false male member 3 and the corresponding part of the sleeve 4.

FIG. 4 schematically shows how the female threads 5 and 6 of the sleeve 4 are positioned relative to each other. These two threads are cut in the same helical direction. On FIG. 4 the phantom lines 5a and 5b as well as 6a and 6b are the lines of the roots and the crests of the threads respectively of the two threads 5 and 6. The broken lines represent the theoretical contours of the threads which, by reason of the interfitting of the two threads are positioned in the open and have not, for this reason, been cut back.

Finally, the dotted lines represent the shapes of the threads which have been cut into one thread to form the other thread. In this manner the threads 6 at the right side of FIG. 4 extend to the left of the plane I along the imaginary line 15 which is situated either in a recess between the threads 5 or inside the sleeve up to the point 16 at which the thread 6 cuts the recess 17 in the rear face of the thread 18. In like manner the threads 5 extend to the right of the plane I along an imaginary line 19 cutting the recesses 20 and 21 in the threads 22 and 23. It will be noted that the recesses 17, 20 and 21 as well as those which may exist in the threads not shown on FIG. 4, are always situated on the rear face of the threads, that is to say, on the face of the threads which is not subjected to pressure during assembly. This results from the relative position of the two threads 5 and 6. For this reason, the two surfaces on which the threads 5 and 6 are cut (and consequently the frusto-conical reference surfaces 5a and 5b on the one hand and 6a and 6b on the other hand which respectively define the threads 5 and 6) are situated symmetrically with respect to plane I of the sleeve, the thread 6 is, with respect to perfect symmetry, displaced to the right by a fraction of the width of a thread. It follows that (while the thread 6 could be perfectly symmetrical with the thread 5 if it started at plane I) the thread 6 starts at plane Ia which is slightly spaced from plane I as may be seen in FIG. 4.

It will be understood that by operating in this manner the two threads 5 and 6 are overlapped so that the fronts of the threads of one set overlap the rear faces of the threads of the other set. This assures effective support of the part of the male member 1 which, during screwing, is situated between the planes I and II (FIG. 2), the front sides of the threads of the male member engaging and bearing at least partially in the recesses in the threads 6 which result from the prolongation of the threads 5 to the right beyond the plane I.

Figure 3:
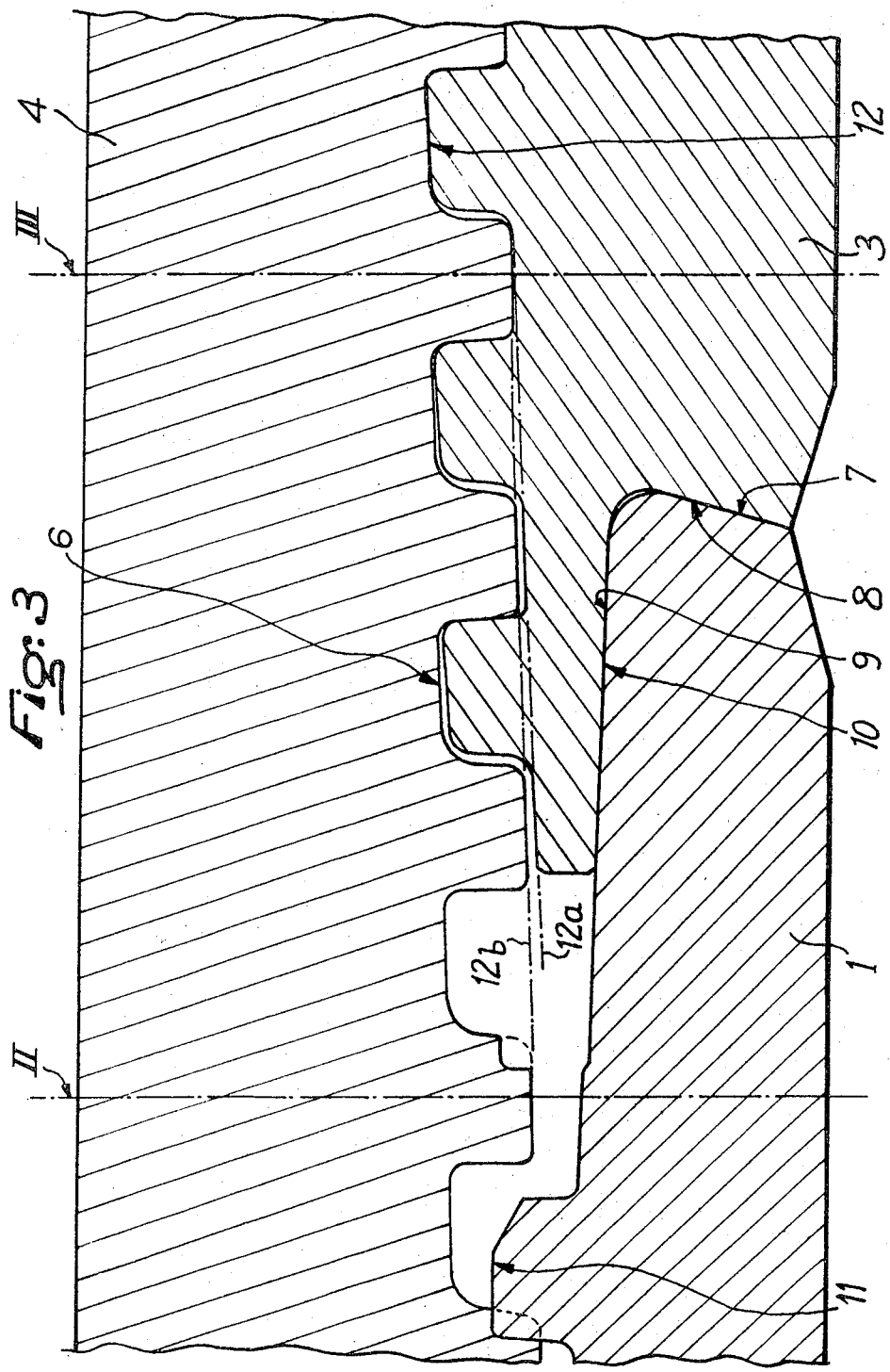
FIG. 3 is a sectional view on a larger scale showing the clearance which exists between the end of the false male member and the sleeve.

FIG. 3 shows an embodiment having a clearance between the end of the false male member 3 and the sleeve 4. For this purpose, the thread 12 of the false male member 3 at the left of the plane III has a conicity slightly more pronounced than in the part which is at the right of the plane III as seen in FIG. 3. The line generating the roots of the threads 12b corresponds to the part of the threads situated at the right of the plane III while the line 12a corresponds to the part of the threads situated at the left of the plane III, which has the effect of ensuring a progressive clearance between the false male member 3 and the sleeve, between the planes II and III, as may be clearly seen on FIG. 3.

FIG. 5 schematically illustrates a preferred embodiment of the invention with respect to the respective heights of the male threads 12 and the grooves between the threads of the sleeve 4. In accordance with this embodiment of the invention a clearance is left in all cases between the crests of the threads 12 and the grooves between the threads 6, as well as between the rear faces of these threads. This is produced by arranging for the maximum manufacturing tolerance for the heights of the threads 12 to be less than the minimum manufacturing tolerance for the depths of the grooves between the threads 6. This results in a great regularity in the making up torque required to mount the false male member 3 permanently in the sleeve 4. This characteristic of the relative clearances which facilitates the exact seating of the false male member in the sleeve may be provided in a joint according to the invention because it is not necessary for a seal to exist along the threads connecting the male parts to the sleeve, which in certain cases may be advantageous.

In order that the invention may be better understood, one embodiment thereof will now be described, including the relative dimensions of its different components. The tubes to be assembled are sections of steel pipe adapted for use in the petroleum industry having an external diameter 127.4 millimeters and a thickness of 9.19 millimeters. The threads by which these pipe sections are connected to the sleeve are threads having an asymmetrical trapezoidal section with very rounded edges. The fronts of the threads have an inclination of 3° to a plane perpendicular to the axis of the pipe. The pitch of the threads is 5.08 millimeters which corresponds to a thread thickness of 2.54 millimeters.

The sleeve has a total length of 231 millimeters and a thickness at its ends of 7 millimeters. The conicity of the threaded cones corresponds to an increase in diameter of 6.25 percent of the longitudinal displacement. The threads which receive the false male members are spaced from the plane of symmetry by a distance equal to 1.5 millimeters (said distance corresponding to the displacement between the planes I and Ia of FIG. 4).

The surface 7 which constitutes the stopping abutment and the surface 8 of the male member are inclined 15° with respect to a plane perpendicular to axis of the pipe. The width of these surfaces is 4 millimeters.

The inclination of the surfaces 9 and 10 with respect to a plane perpendicular to the axis of the pipe is 87° which corresponds to a conicity of 10 percent of the diameters.

The distance between the planes I and II is 10 millimeters. The distance between the planes II and III is 17 millimeters. The variation in the conicity of the threads situated at the end of the false male member beyond the plane III is such that the maximum clearance existing between the sleeve at the end of the false male member 3 is 0.25 millimeters. This clearance prevents the end of the false male member from being deformed beyond its elastic limit.

It will be understood that the embodiment which has just been described has been given purely by way of illustration and example and may be modified as to detail without thereby departing from the basic principles of the invention. In particular, it is obvious that the zone 9 of the shoulder as well as the corresponding zone 10 of the male member may have shapes and inclinations which are substantially different from those shown in the drawings. It is also obvious that the clearance which, in accordance with the invention, must exist between the end of the false male member and the corresponding surface of the sleeve, may be otherwise obtained than by modifying the conicity of the threads of the false male member. It remains necessary, however, that this clearance, while being sufficient to permit compensation for the manufacturing tolerances of the two threads on the sleeve, be sufficiently small to prevent the production of permanent deformations prejudicial to the end of the false male member during making up of the joint. Finally, it goes without saying that the bevels 13 and 14 at the inside of the tubes at the level of the shoulder are not a characteristic of the invention.

Furthermore, in certain cases it is possible to invert the shapes of the abutments between the true and false male members so that the abutment on the composite female member is concave on the inside and convex on the outside.

What is claimed is:

1. In a joint for connecting metallic pipe sections comprising a male member provided with a thread formed on a frusto-conical outer surface, and a female member provided with a mating thread formed on a frusto-conical inner surface of said female member, said female member having a shoulder positioned at the inner end of the threads thereon, which shoulder limits the penetration of said male member into said female member due to the abutment of the end of said male member against said shoulder, and which shoulder is provided with an annular groove defined by a frusto-conical inner surface which inclines inwardly of said female member as it approaches the tip of said shoulder, and an outer surface encircling said inner surface, said male member having a lateral surface adjacent the inner end thereof which is spaced by a first lateral clearance from the encircling portion of said female member, the improvement according to which:

said female member is a composite member comprising a sleeve and a false male member, said sleeve being provided with two female threads positioned on frusto-conical surfaces, each of which is inclined outwardly as it approaches one of the two ends of the sleeve, one of which female threads is the thread mating with said male member and separably receives said male member, while the other female thread permanently grips mating threads on said false male member, said shoulder being formed at the end of said false male member and a second lateral clearance being provided between the shoulder-carrying end of said false male member and the part of said threaded sleeve encircling it.

2. Joint as claimed in claim 1 in which the threads on the sleeve which receive the male member extend beyond the plane of intersection of the two threaded frusto-conical surfaces on the sleeve, so as to overlap the threads which receive the false male member.

3. Joint as claimed in claim 2 in which said overlapping threads are formed by cutting them into the rear faces of the threads which receive the false male member.

4. Joint as claimed in claim 1 in which the shoulder on the false male member lies within the zone of the sleeve which carries the threads receiving the false male member.

5. Joint as claimed in claim 4 in which the shoulder lies within the part of the sleeve which has the threads receiving the false male member, beyond the overlap into this part of the threads which receive the true male member.

6. Joint as claimed in claim 1 in which the lateral clearance between the end of the false male member and the encircling part of the threaded sleeve is large enough to compensate for manufacturing tolerances with respect to the two threads of the sleeve but small enough to prevent any permanent deformation injurious to the end of the false male member.

7. Joint as claimed in claim 1 in which the lateral clearance between the end of the false male member and the encircling part of the threaded sleeve is produced by imparting a slightly more pronounced conicity to the end of the false male member.

8. Joint as claimed in claim 1 in which the lateral clearance between the end of the false male member and the encircling part of the threaded sleeve is produced by imparting a decreased conicity to the part of the threaded sleeve encircling the end of the false male member.

9. Joint as claimed in claim 1 in which the sleeve is shrunk on the false male member.

10. Joint as claimed in claim 1 in which the generatrix of the frusto-conical inner surface the shoulder makes an angle between 10° and 30° and preferably between 15° and 20° with a plane perpendicular to the axis of the joint.

11. Joint as claimed in claim 1 in which the threaded sleeve is made of a different steel from the steel of which the male member and the false male member are made.

* * * * *